UNITED STATES PATENT OFFICE.

MARSHALL TURLEY, OF COUNCIL BLUFFS, IOWA.

IMPROVED COMPOSITION FOR STAINING WOOD.

Specification forming part of Letters Patent No. 42,974, dated May 31, 1864.

*To all whom it may concern:*

Be it known that I, MARSHALL TURLEY, of Council Bluffs, in the county of Pottawattomie and State of Iowa, have invented a new and Improved Composition for Staining Wood; and I do hereby declare that the following is a full, clear, and exact description of the same.

The object of this invention is to produce on cheap or inferior wood—such as pine, maple, &c.— a stain similar to that of mahogany or other costly wood, and to give to the surface of said cheap wood a rich and polished appearance.

The invention consists in a composition of lye or alkaline solution and terra-japonica mixed together in such proportion as may be necessary to produce the desired effect.

The lye which I use for my composition may be prepared by dissolving a quantity of sal-soda or other alkali in water, and I obtain a lye of sufficient strength if I use the salt in the following proportion: Sal-soda or other alkali, one-fourth pound; water, one pint. This proportion may, however, be altered according to the nature of the alkali. In the lye obtained by this operation I dissolve terra-japonica from two to eight ounces. The strength of the composition depends chiefly upon the quantity of terra-japonica used in the composition, and this quantity must be altered according to the wood for which the composition is intended and according to the darkness of the stain to be produced. By adding more japonica the color becomes darker, and the shade can thus be regulated to suit convenience.

The composition is ready for use as soon as the desired quantity of terra-japonica has been dissolved in the lye, and it is applied to the surface of the wood by means of a brush.

It it obvious that previous to the application of my composition the surface of the wood to be stained must be planed perfectly smooth, and the effect of the staining composition is increased the smoother the surface on which it is applied. After the composition has been applied, the wood is left to dry, and after it has been varnished it presents a beautiful variegated surface.

What I claim as new, and desire to secure by Letters Patent, is—

The within-described composition for staining wood, made of the ingredients above specified, and mixed together substantially in the manner and about in the proportion set forth.

MARSHALL TURLEY.

Witnesses:
JAMES WHITELAW,
GEO. W. REED.